Dec. 21, 1965    A. K. CHITAYAT    3,224,323
INTERFEROMETRIC OPTICAL ANGLE MEASURING DEVICE
Filed Oct. 19, 1961

INVENTOR.
ANWAR K. CHITAYAT
BY James P. Malone

United States Patent Office 3,224,323
Patented Dec. 21, 1965

3,224,323
INTERFEROMETRIC OPTICAL ANGLE
MEASURING DEVICE
Anwar K. Chitayat, Plainview, N.Y., assignor to
Optomechanisms, Inc., Mineola, N.Y.
Filed Oct. 19, 1961, Ser. No. 146,302
4 Claims. (Cl. 88—14)

This invention relates to means for measuring angles optically and more particularly to such means having interferometer means for measuring very small angles.

The system described here is designed for the measurement of angles with extremely high accuracy and repeatability (better than +0.05 second of arc). It is recognized that such accuracies can best be achieved by interferometric means, since the motion measured for 0.05 second is only $$\frac{1}{4,000,000}$$

inch per inch, which is too small to be measured reliably by mechanical means. The present interferometric system on the other hand is practically independent of temperature, pressure and environment, and constitutes an absolute measure of distance, provided that deteriorating vibrations are minimized.

The present invention generally combines a reflector rotatably mounted and mechanical means for measuring the rotation very accurately to provide a coarse measurement, in combination with interferometer means to provide a fine measurement. The interferometer means utilizes a fringe pattern and measures the spacing between the fringes.

Accordingly, a principal object of the invention is to provide new and improved optical angle measuring means.

Another object of the invention is to provide new and improved optical angle measuring means comprising mechanical means for measuring the rotation of a reflector to provide a coarse reading in combination with interferometer means for providing a fine reading.

Another object of the invention is to provide new and improved optical angle measuring means comprising mechanical means for measuring the rotation of a reflector to provide a coarse reading in combination with interferometer means for providing a fine reading, the interferometer means being adapted to measure the spacing between fringes in a fringe pattern.

Another object of the invention comprises means for measuring angles comprising a first mirror rotatably mounted, means connected to said mirror to create an interference fringe pattern, mechanical means for measuring the angle of rotation of said mirror to provide a coarse reading and means to measure the spacings between the fringes of said pattern to provide a fine reading.

These and other objects of the invention will be apparent from the following specification and drawings, of which;

Figure 1:
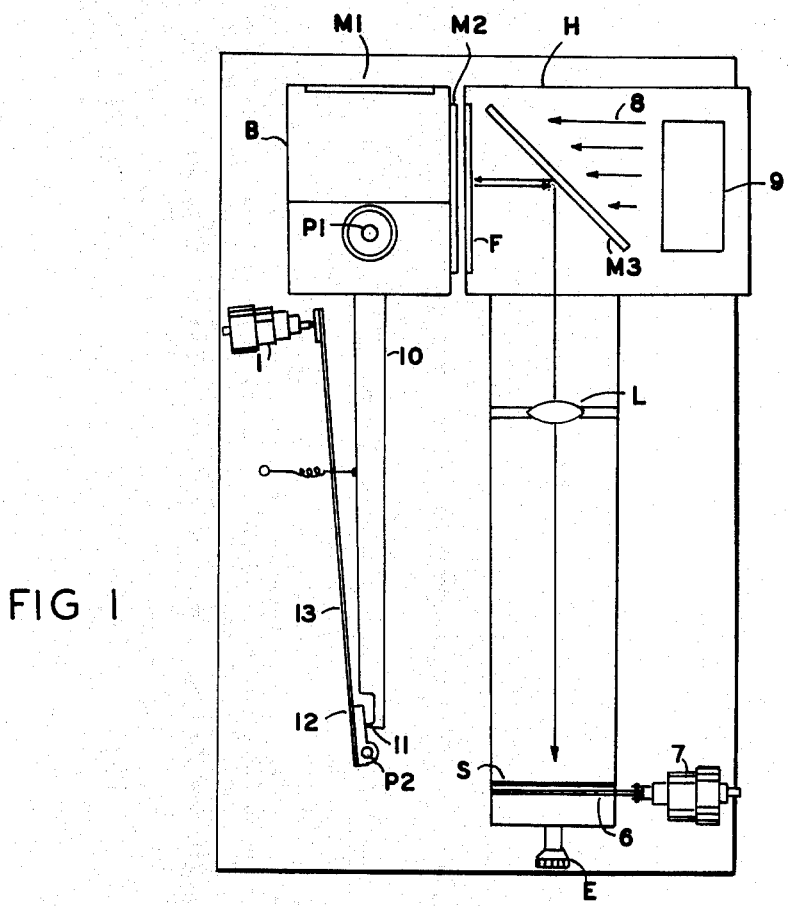
FIG. 1 is a plan view of an embodiment of the invention.

Referring to FIG. 1 the present device provides the angular movement of a mirror M1 by precision mechanisms which rotate M1 about the pivot P1. The rotation of the mirror is achieved by mechanical linkages that rotate the block B holding mirrors M1 and M2 about the pivot P1.

More specifically, the block B on pivot P1 is connected to shaft 10 which terminates in knife edge 11 which bears on block 12 of lever 13 which is pivotally mounted on pivot P2. Calibrated micrometer 1 bears against lever 13. This construction is shown in detail in copending application S.N. 50,893 for Optical Measuring Means filed August 22, 1960, by Andre R. Brault, assigned to the assignee of this application, now Patent No. 3,056,207, granted October 12, 1962.

This movement can also be achieved by screws actuating a long arm, a servo driven positioning system or an inch-worm drive. The mechanical movement is not intended to obtain the final measurement, but is provided to allow the coarse setting of the positioner which may be read by micrometer 1.

The interferometer readout shown in FIG. 1 allows the precise measurement to better than +0.05 second of arc. Thus, a coarse setting may be made by reading the micrometer 1, and the precise reading is achieved by the interferometer scale S, as will be described.

In the interferometer a flat mirror M2 is fixed to the rotatable block B containing the main mirror M1. Consequently, by measuring the angle of M2, the angle of M1 is determined. F is an optical flat which is attached to the fixed housing H. A monochromatic light source 9 transmits light rays 8 through the flat F and onto the rotating mirror M2, which are then reflected through the semi-reflecting mirror or beam splitter M3 to the lens L. Fringes are developed by interference between the flat F and the mirror M2. The spacing of the fringes is dependent on the angular relationship of F and M2.

Figure 2:
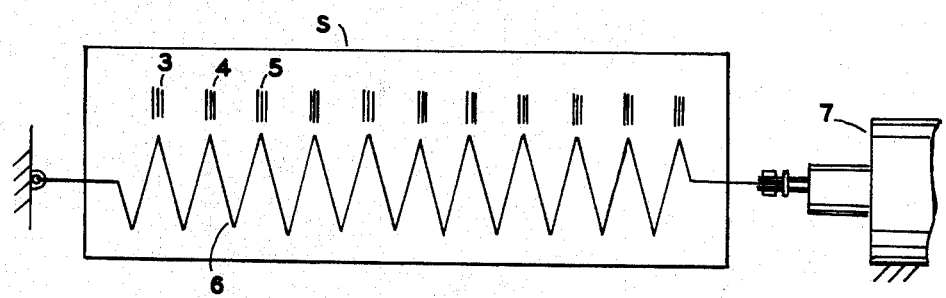
FIG. 2 is an enlarged detail view of a scale means for measuring the spacing of the fringe pattern.

Referring also to FIG. 2 the image of the fringes 3, 4, 5, etc. is focused by lens L on the plane screen S along a fringe measuring scale, which is then observed by the operator through the magnifier eyepiece E. The scale may comprise a spring 6 connected to a calibrated micrometer 7 which is adjusted by the operator until the spacing of the spring or scale is in correspondence with the fringes. The micrometer 7 readout indicator then shows the angular measurement for instance in 0.05 second of arc increments. The scale is observed by the operator when looking through the eyepiece E. The eyepiece preferably contains a 90° prism and magnifier which directs the illumination either upwards or to the side, for operator convenience. The viewing direction is adjusted by merely turning the eyepiece housing. Instead of the spring 6 a parallelogram linkage may be used, to measure the spacing of the fringes.

The use of the system is relatively simple. If the operator desires to move the positioner by 1.1 second, he merely sets the fringe readout scale to 1.1 second and moves the mechanical linkages to turn the mirrors M1 and M2 about the pivot until the fringes correspond to the scale. There is no requirement for an optically experienced operator since the measurement is rather simple. The total range of the scale can be 30 seconds up to 1°.

The system described above has the advantage of high reliability and accuracy, since it uses the fixed wavelength of light as the measuring parameter. No wedges or optical elements are introduced in the path to the main mirror M1. Consequently, the system can be used without deteriorating the resolution capability or amount of light reflected by the positioning mirror M1. An instrument of the highest quality is thus achieved.

The spacing between the fringes can be measured automatically by providing a slit mask in place of the spring 6. This slit may be moved a known distance, and the number of fringes counted by a phototube or phototransistor to determine the angular measurement. Another method of determining the spacing of the fringes is to move the slit at a constant speed until a known number of fringes are measured. The distance between the known number of fringes is determined by measuring the time required to measure the known number of fringes.

The measurement of time can be made by an electronic counter. Now, since the motor speed driving the slit is known, the distance traversed is determined by multiplying the measured time by the known speed.

Many modifications may be made by those who desire to practice the invention without departing from the scope thereof which is defined by the following claims:

I claim:
1. Means for accurately measuring the angle of rotation of a first mirror rotatable about a pivot point, comprising a second mirror having a fixed angular relation to said first mirror, an optical flat having a fixed position and spaced closely to said second mirror, a source of light directed toward said optical flat and said second mirror to produce a fringe pattern, a viewing screen, and a semi-reflecting mirror placed between said light source and said optical flat and adapted to reflect a fringe pattern reflected from said second mirror onto said viewing screen, mechanical means to measure the rotation of said first mirror to provide a coarse reading comprising a first lever connected to said second mirror at one end, a knife edge on the other end of said first lever, a second lever pivotally mounted on the neutral axis of said first lever, said second lever having a bearing block adjacent one end bearing against said knife edge, and a micrometer bearing against the other end of said second lever, and means to measure the spacings of said fringe pattern.

2. Means for accurately measuring the angle of rotation of a first mirror rotatable about a pivot point, comprising a second mirror having a fixed angular relation to said first mirror, an optical flat having a fixed position and spaced closely to said second mirror, a source of light directed toward said optical flat and said second mirror, an eyepiece, and a semi-reflecting mirror placed between said light source and said optical flat adapted to reflect a fringe pattern reflected from said second mirror onto said eyepiece and means to measure the spacings of said fringe pattern, to provide a fine measurement of said angle, and calibrated lever means to provide a coarse measurement of said angle.

3. Apparatus as in claim 1 wherein said last means comprises a spring connected to a scale.

4. Apparatus as in claim 1 wherein said last means comprises an expandable mechanical linkage and a scale.

References Cited by the Examiner
UNITED STATES PATENTS

| | | | |
|---|---|---|---|
| 2,571,937 | 10/1951 | Peck | 88—14 |
| 2,993,404 | 7/1961 | Rouy. | |
| 2,997,913 | 8/1961 | Putten et al. | 88—14 |
| 3,056,207 | 10/1962 | Brault | 88—14 X |

FOREIGN PATENTS

| | | |
|---|---|---|
| 598,911 | 6/1934 | Germany. |

JEWELL H. PEDERSEN, *Primary Examiner.*

EMIL G. ANDERSON, *Examiner.*